US010499470B1

(12) United States Patent
Tsai

(10) Patent No.: US 10,499,470 B1
(45) Date of Patent: Dec. 3, 2019

(54) LIGHT EMITTING DEVICE CONTROLLED BY PLACEMENT ANGLE THEREOF

(71) Applicant: CYCLE NAME INDUSTRIES CO., LTD., Taoyuan (TW)

(72) Inventor: Tsung-Pei Tsai, Taoyuan (TW)

(73) Assignee: CYCLE NAME INDUSTRIES CO., LTD., Taoyuan (TW)

( * ) Notice: Subject to any disclaimer, the term of this patent is extended or adjusted under 35 U.S.C. 154(b) by 0 days.

(21) Appl. No.: 16/441,754

(22) Filed: Jun. 14, 2019

(51) Int. Cl.

| | |
|---|---|
| ***E06C 7/00*** | (2006.01) |
| ***G01C 9/10*** | (2006.01) |
| ***H05B 33/08*** | (2006.01) |
| ***H05B 37/02*** | (2006.01) |
| ***E06C 1/12*** | (2006.01) |

(52) U.S. Cl.
CPC ........... *H05B 33/0854* (2013.01); *E06C 1/12* (2013.01); *E06C 7/003* (2013.01); *H05B 37/0227* (2013.01)

(58) Field of Classification Search
None
See application file for complete search history.

(56) References Cited

U.S. PATENT DOCUMENTS

2006/0151685 A1* 7/2006 Hsu ........................ G01D 5/342 250/231.1
2010/0273585 A1* 10/2010 Vann .................. A63B 69/0071 473/450

FOREIGN PATENT DOCUMENTS

TW I306915 B 3/2009

* cited by examiner

*Primary Examiner* — Dedei K Hammond
(74) *Attorney, Agent, or Firm* — Muncy, Geissler, Olds & Lowe, P.C.

(57) ABSTRACT

A light emitting device controlled by placement angle thereof includes a housing space disposed inside a shell element, wherein a light emitting element, a power supply element, and a conductive element are disposed in the housing space. The conductive element has a passage having a conductor therein. By a tilt of the shell element, a placement angle thereof is changed, whereby the conductor moves inside the passage between a conducting position and a disconnecting position. The wire set between the light emitting element and the power supply element is conductive when the conductor is at the conducting position, and is not conductive when the conductor is at the disconnecting position. Thus, the light emitting element is able to be controlled by changing the placement angle of an object to which the light emitting device attached, thereby achieving the convenience for usage.

10 Claims, 6 Drawing Sheets

LIGHT EMITTING DEVICE CONTROLLED BY PLACEMENT ANGLE THEREOF

BACKGROUND OF THE INVENTION

1. Field of the Invention

The present invention relates to light emitting devices, and more particularly, to a light emitting device which is selectively turned on by the change of the placement angle thereof.

2. Description of the Related Art

As shown by Taiwan patent 1306915, an extension ladder includes a plurality of ladder pole units, connection kits, locking mechanisms, and transverse step portions. The extension ladder is allowed to be extended for climbing and contracted for storage. This kind of extension ladder is easily stored and therefore being widely used, especially for ships having narrow space, wherein the extension ladder is pivotally attached to the hull of the ship, so as to be lifted for a user to climb up and down during marine operations.

However, when the sky is dark, the user may be incapable of seeing the position of the extension ladder clearly, and thus has to spend more time to find out the ladder, causing the inconvenience of usage. Even though it is possible to attach a light emitting device to the extension ladder, for achieving a stable power supply, the light emitting device has to be electrically connected to a power source through a cable, such that the user is allowed to manually turn on or turn off the light emitting device. Thus, the operation of the extension ladder is easily affected by the cable, and the manual control of the light emitting device also causes an inconvenience of usage.

SUMMARY OF THE INVENTION

For improving problems mentioned above, the present invention provides a light emitting device controlled by placement angle thereof. A light emitting element of the light emitting device is turned on and off by the variation of the placement angle of an object to which the light emitting device is attached, thereby achieving a convenient method for controlling the light emitting device.

In one embodiment of the present invention, a light emitting device controlled by placement angle thereof is provided, which includes:

a shell element having a housing space;

a light emitting element disposed in the housing space and having a first conductive terminal and a second conductive terminal;

a power supply element disposed in the housing space and having a first electrode and a second electrode, wherein one of the first electrode and the second electrode is a positive electrode and the other of the first electrode and the second electrode is a negative electrode, the first electrode being electrically connected to the first conductive terminal; and a conductive element, disposed in the housing space and having a passage in the conductive element, with a conductor disposed inside the passage. The second conductive terminal and the second electrode stretch into the passage with a first wire and a second wire, respectively. The tilt of the shell element changes the placement angle thereof, thereby causing the movement of the conductor inside the passage between a conducting position and a disconnecting position. When the conductor is at the conducting position, the first wire and the second wire are electrically connected, whereby the light emitting element is electrically connected to the power supply element to emit a light. When the conductor is at the disconnecting position, the first wire and the second wire are electrically disconnected, whereby the light emitting element is electrically disconnected from the power supply element and incapable of emitting the light.

Thus, the lighting function of the light emitting element is controlled by the change of the placement angle caused by the tilt of the object to which the shell element is attached. In other words, the conduction is controlled by the movement of the conductor between the conducting position and the disconnecting position, whereby the light emitting element is selectively turned on or turned off, without the need of additional wires which may affect the convenience of usage of the object. Also, it is unnecessary for a user to manually turn on or turn off the light emitting device, preventing the power waste caused by the user forgetting to turn off the device from happening.

BRIEF DESCRIPTION OF THE DRAWINGS

FIG. 5 is a schematic view illustrating the light emitting device being attached to a ladder, wherein the ladder is in an operation status and the light emitting device is turned on.

DETAILED DESCRIPTION OF THE INVENTION

Figure 1:
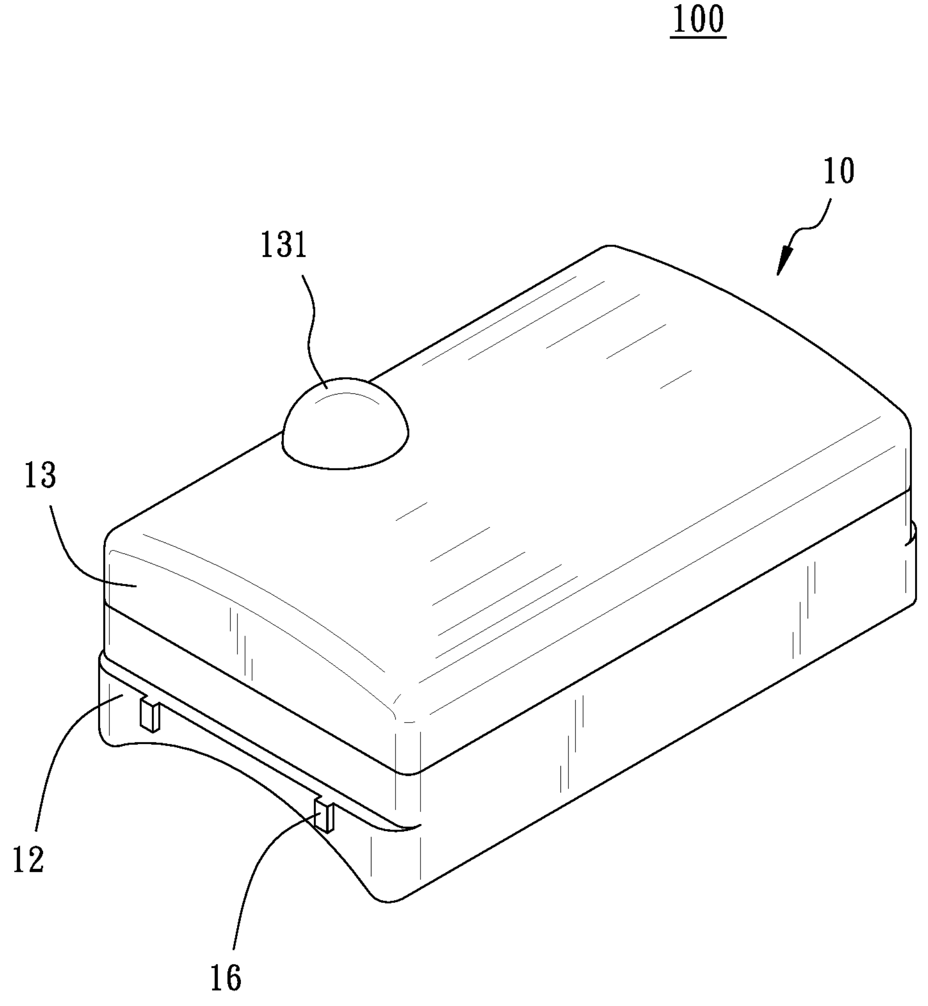
FIG. 1 is a perspective view of the light emitting device in accordance with an embodiment of the present invention.
Figure 2:
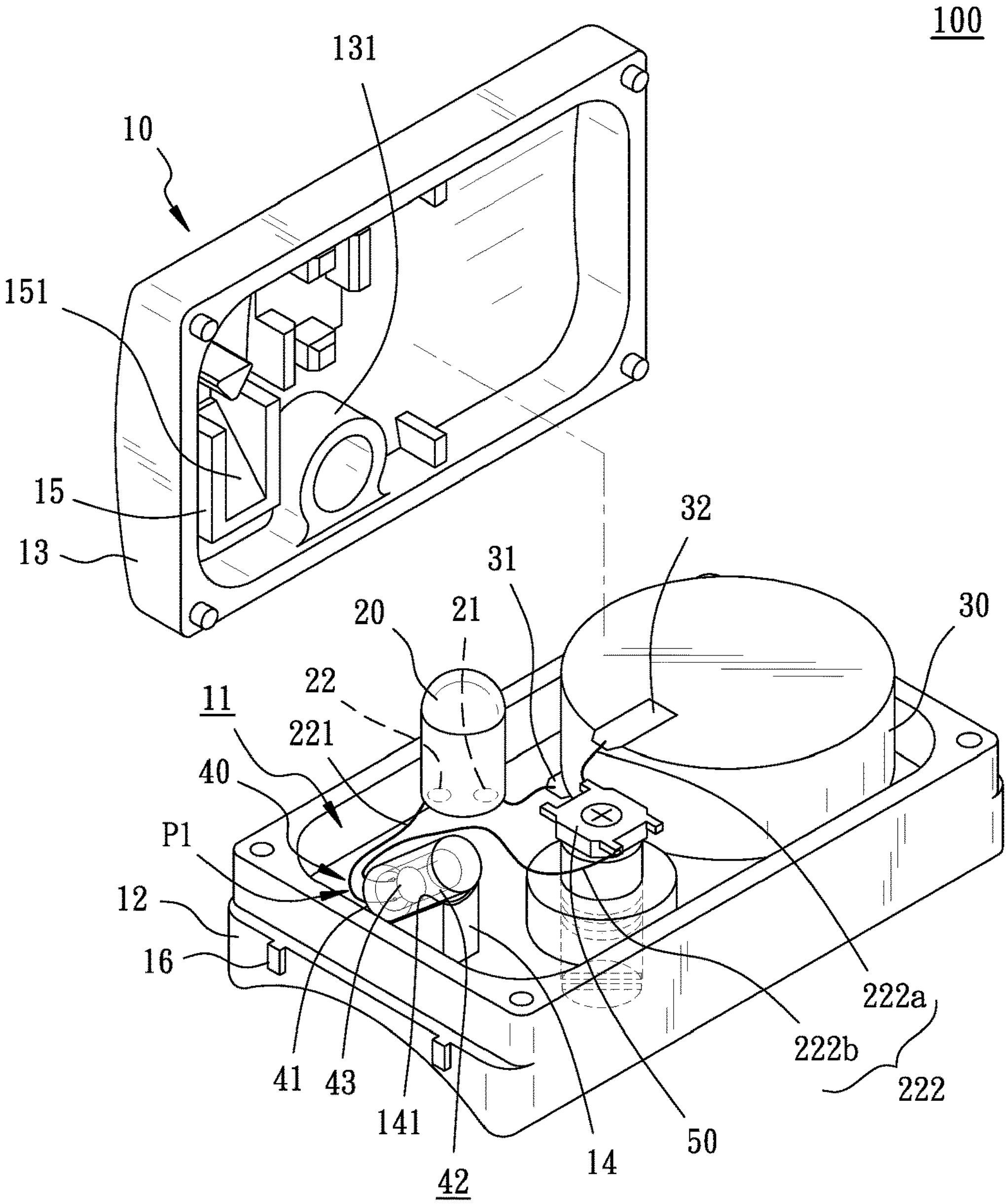
FIG. 2 is an exploded view of the light emitting device in accordance with an embodiment of the present invention, wherein a conductor is at a conducting position.
Figure 3:
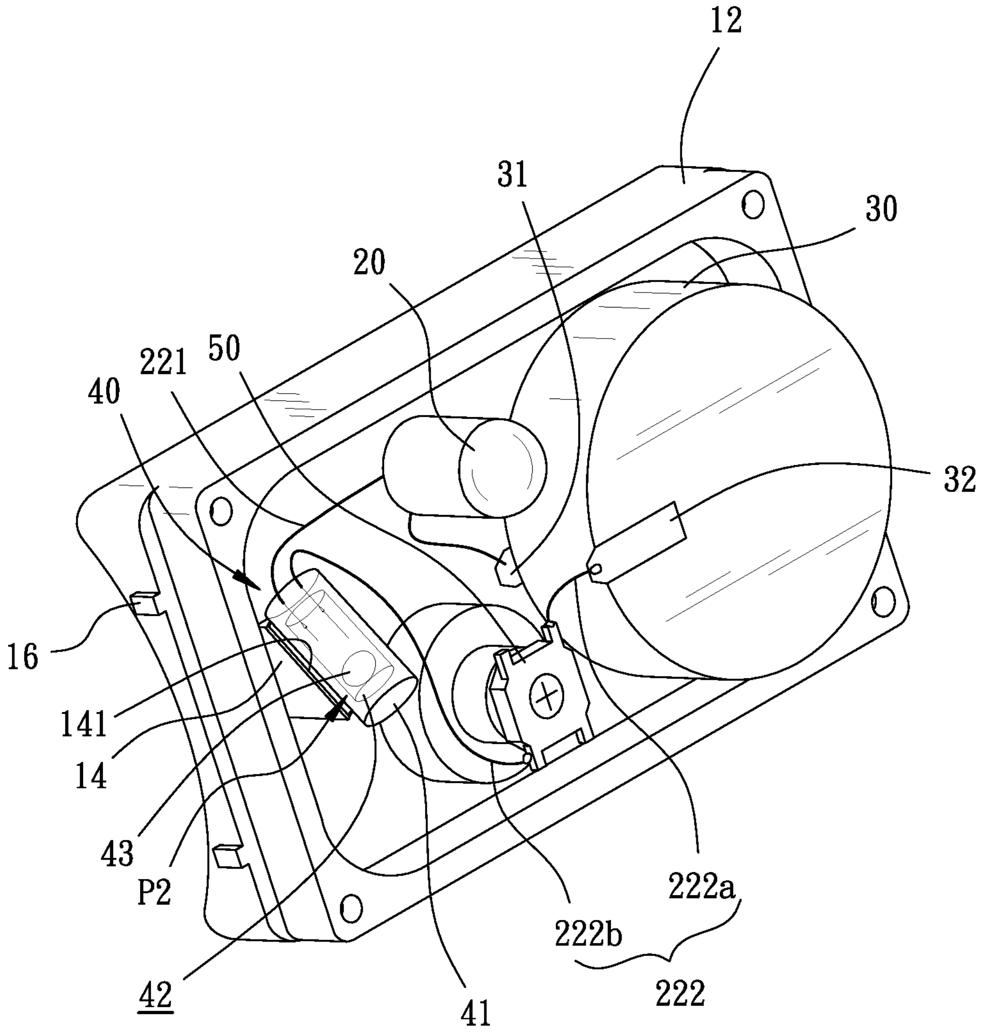
FIG. 3 is an exploded view of the light emitting device in accordance with an embodiment of the present invention, wherein a shell element is tilt and a conductor is at a disconnecting position.
Figure 4:
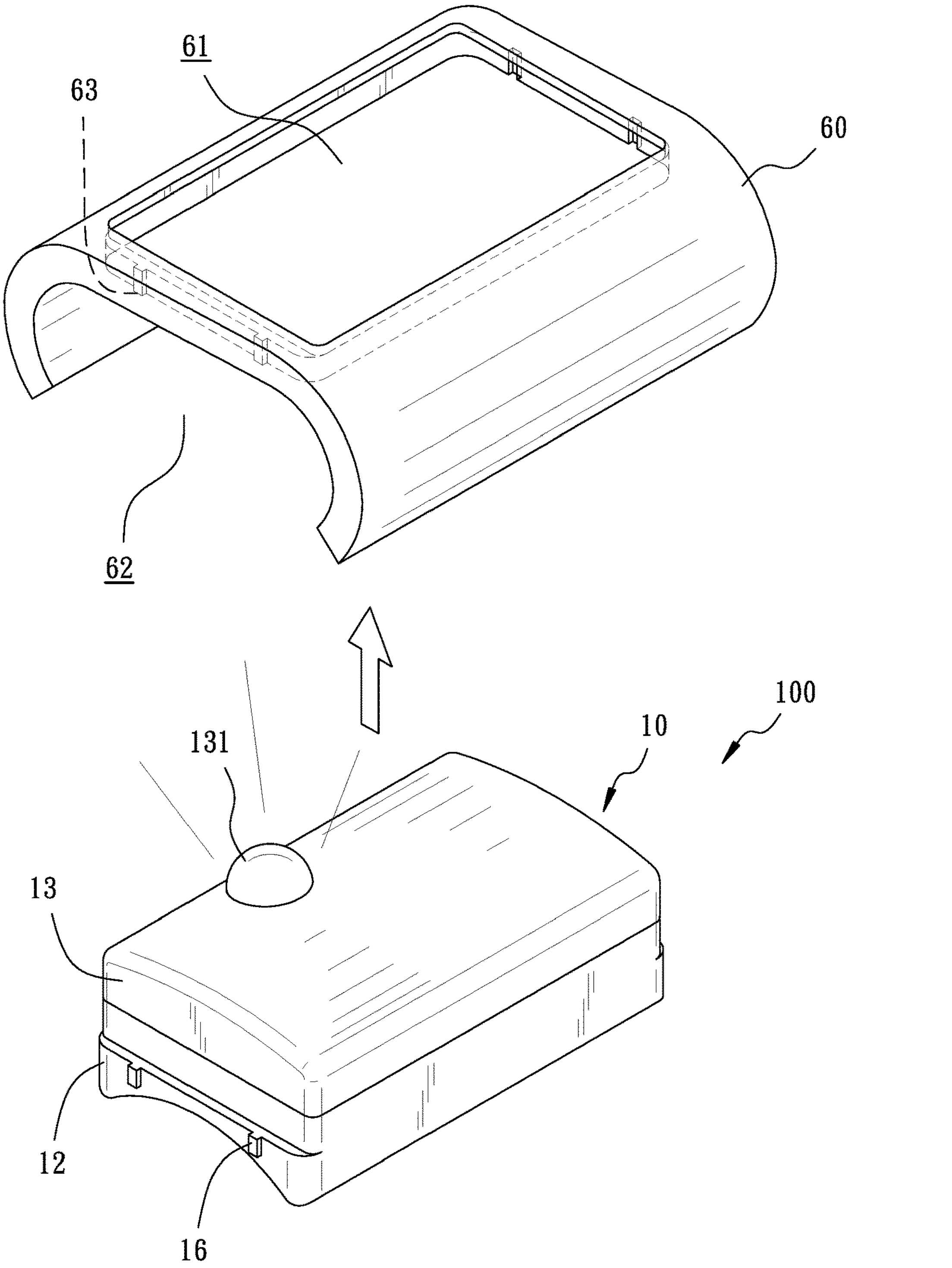
FIG. 4 is a schematic view illustrating the combination status of the light emitting device and the positioning element thereof.

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 6, a light emitting device controlled by placement angle thereof is provided. The light emitting device includes a shell element 10, a light emitting element 20, a power supply element 30, and a conductive element 40.

The shell element 10 has a housing space 11, which houses the light emitting element 20, the power supply element 30, and the conductive element 40. In a preferred embodiment, the shell element 10 includes a first shell part 12 and a second shell part 13, wherein the shell 10 is formed by the combination of the first shell part 12 and the second shell part 13, with the housing space 11 formed therebetween. In addition, in the housing space 11, the first shell part 12 has a first pedestal 14, which has an inclined plane 141. In the housing space 11, the second shell part 13 has a second pedestal 15, which has an oblique groove 151. When the first shell part 12 is combined with the second shell part 13, the inclined plane 141 and the oblique groove 151 are also combined with each other. Further, the second shell part 13 has an accommodation part 131, wherein the accommodation part 131 is arranged on the second shell part 13 and is light-transmissive.

The light emitting element 20 includes a first conductive terminal 21 and a second conductive terminal 22. In this embodiment, the light emitting element 20 is a light emitting diode arranged to be accommodated in the accommodation part 131. When the light emitting element 20 emits light, the light emitted therefrom is able to pass through the accommodation part 131.

The power supply element 30 in this embodiment is a mercury battery having two opposite sides, wherein one side has a first electrode 31, and the other side has a second electrode 32. In this embodiment, the first electrode 31 is a positive electrode, while the second electrode 32 is a negative electrode. When the first electrode 31 and the second electrode 32 are directly electrically connected by a wire, a short circuit is formed; when there is an electrical load (for example, the light emitting element 20) placed therebetween, the power supply element 30 is able to supply electricity for operation. In this embodiment, the first electrode 31 is electrically connected with the first conductive terminal 21.

The conductive element 40 has a tube body 41, which has a passage 42 therein, wherein a conductor 43 is disposed in the passage 42. The second conductive terminal 22 and the second electrode 32 stretch into the passage 42 at an end of the tube body 41 with a first wire 221 and a second wire 222, respectively. Thus, when the shell element 10 is tilt to change the placement angle thereof, the conductor 43 moves inside the passage 42 between a conducting position P1 and a disconnecting position P2. When the conductor 43 is at the conducting position P1, the first wire 221 and the second wire 222 are conductively connected, whereby the light emitting element 20 is electrically connected with the power supply element 30 for emitting light. When the conductor 43 is at the disconnecting position P2, the first wire 221 and the second wire 222 are electrically disconnected, whereby the light emitting element 20 is electrically disconnected from the power supply element 30 and incapable of emitting light. In a preferred embodiment, the conductor 43 is a liquid mercury having the characteristic of a changeable shape which is different from a fixed spherical structure of a solid metal bead, so as to be allowed to contact both the first wire 221 and the second wire 222 simultaneously inside passage 42. Further, the tube body 41 is transparent and is sealed at both ends, allowing the movement of the conductor 43 in the tube body 42 to be observed during maintenance.

In this embodiment, a switch 50 is further disposed between both ends of the second wire 222, wherein the second wire 222 has a first section **222*a* arranged between the switch 50 and the second electrode 32, and a second section 222*b* arranged between the switch 50 and the tube body 41. The switch 50 is used to switch the electrical connection or disconnection between the first section 222*a* and the second section 222*b*. That is to say, even though the switch 50 is switched for establishing the electrical connection between the first section 222*a* and the second section 222*b*, the first wire 221 is electrically connected with the second wire 222 only if the conductor 43 is at the conducting position P1. When the switch 50 is switched for cutting the electrical connection between the first section 222*a* and the second section 222*b*, the first wire 221 is electrically disconnected from the second wire 222 even though the conductor 43 is at the conducting position P1. Thus, in this embodiment, the first wire 221 is electrically connected with and the second wire 222 only if the conductor 43 is at the conducting position P1 and the switch 50 is switched for electrically connecting the first section 222*a* and the second section 222*b***.

In a preferred embodiment, the light emitting device further includes a positioning element 60, which has an accommodation hole 61. The shell element 10 is able to be attached to the accommodation hole 61, so that the shell element 10 is fixed on an object through the positioning element 60. In this embodiment, the positioning element 60 is a shell formed in an approximate U shape and has a socket 62 for being attached to the object. Further, the positioning element 60 has an engaging groove 63 at both ends of the socket 62, respectively, the shell element 10 has an engaging block 16 corresponding to the engaging groove 63. When the shell element 10 is attached to the accommodation hole 61, the engaging block 16 is engaged with the corresponding engaging groove 63 to be fixed thereto.

Figure 5:
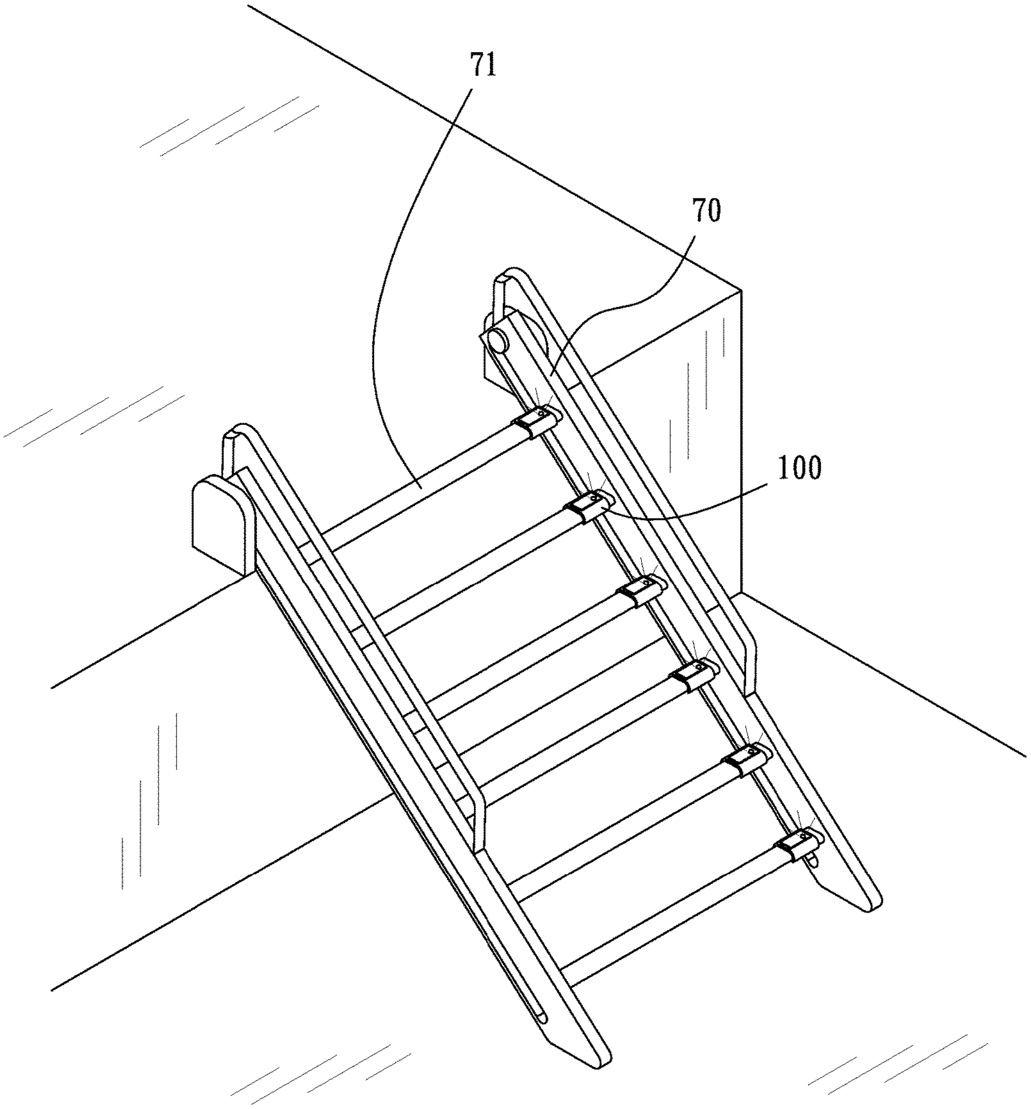
Figure 6:
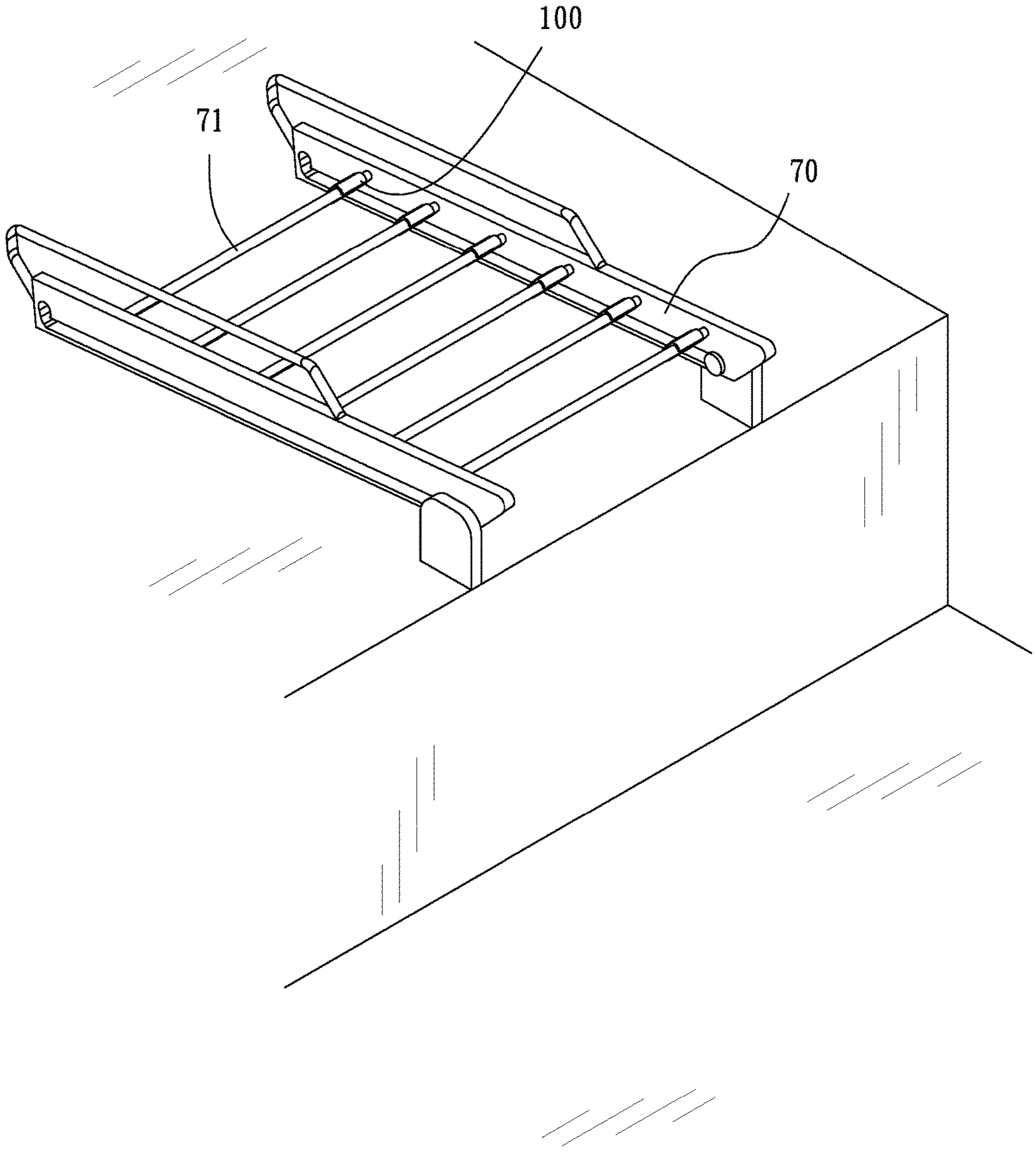
FIG. 6 is another schematic view illustrating the light emitting device being attached to a ladder, wherein the ladder is in a non-operation status and the light emitting device is turned off.

When the light emitting device mentioned in above embodiment is in actual use, for example, attached to a ladder 70 which is slidable and includes a plurality of ladder treads 71, the positioning element 60, which has the shell element 10 attached to the accommodation hole 61 thereof, is able to be attached to the ladder tread 71 through the socket 62. As shown in FIG. 5, the ladder 70 is in an operation status; as shown in FIG. 6, the ladder 70 is in a non-operation status. When the ladder 70 is in the operation status, the ladder treads 71 are horizontally arranged, wherein the conductor 43 in the passage 42 of the tube body 41 is at the conducting position P1, electrically connecting the first wire 221 and the second wire 222, thereby connecting the second conductive terminal 22 and the second electrode 32. Since the first electrode 31 is already electrically connected with the first conductive terminal 21, the light emitting element 20 is electrically connected with the power supply element 30 and emits light. In contrast, when the ladder 70 is in the non-operation status, the ladder treads 71 thereof are arranged to tilt by a placement angle in relation to the horizontal state. As a result, the conductor 43 inside the passage 42 of the tube body 41 is at the disconnecting position P2, electrically disconnecting the first wire 221 from the second wire 222, thereby electrically disconnecting the second conductive terminal 22 from the second electrode 32. Even though the first electrode 31 is already electrically connected with the first conductive terminal 21, the light emitting element 20 is still electrically disconnected from the power supply element 30 and is incapable of emitting light.

The light emitting device provided by the present invention is not limited to the ladder 70 mentioned in the above embodiment. Further, the light emitting device is also able to be used on an extension ladder of a ship, for example, the extension ladder pivotally attached to a hull of the ship for marine operations (not shown). When the placement state changes between the operation status and non-operation status, it also causes the placement angle to change, whereby the light emitting element 20 emits light. The light emitting device provided by the present invention is not limited to ladders, for example, it is also able to be used on a flagpole, wherein the placement state thereof changes between the horizontal state and the vertical state, causing the placement angle thereof to change, and allowing the light emitting element 20 of the light emitting device to emit light. In another example, the light emitting device is also able to be used on a luggage compartment lid of a vehicle, wherein the placement state thereof changes between the opening and closing of the luggage compartment lid, causing the placement angle thereof to change, and also allowing the light emitting element 20 of the light emitting device to emit light.

As will be readily understood from the foregoing description, the present invention is characterized by that the light emitting element 20 is controlled to emit light by the change of the placement angle of the object to which the shell element is attached (for example, the aforementioned ladder 70). When the conductor 43 inside the passage 42 moves to the conducting position P1, the light emitting element 20 is turned on; when the conductor 43 inside the passage 42 moves to the disconnecting position P2, the light emitting element 20 is turned off. Thus, it is unnecessary to apply any wire connection which may affect the convenience of usage. Further, without an additional switch for switching on and off the light emitting element 20, the light emitting device does not have to be manually controlled by a user, preventing the power waste caused by the user forgetting to turn off the device from happening. Thus, the light emitting device provided achieves a conveniently controlled light emitting element 20.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A light emitting device controlled by placement angle thereof, comprising:

a shell element comprising a housing space;

a light emitting element disposed in the housing space and having a first conductive terminal and a second conductive terminal;

a power supply element disposed in the housing space and having a first electrode and a second electrode, one of the first electrode and the second electrode being a positive electrode, the other of the first electrode and the second electrode being a negative electrode, the first electrode being electrically connected with the first conductive terminal; and a conductive element disposed in the housing space and having a tube body, the tube body having a passage, with a conductor disposed in the passage, the second conductive terminal and the second electrode stretching into the passage from an end of the tube body with a first wire and a second wire, respectively; the shell body tilts to change a placement angle of the shell body, such that the conductor moves between a conducting position and a disconnecting position; when the conductor is at the conducting position, the light emitting element is electrically connected with the power supply element and thus emits light; when the conductor is at the disconnecting position, the light emitting element is electrically disconnected from the power supply element and does not emit light.

2. The light emitting device of claim 1, wherein the conductor is a shape-changeable liquid mercury.

3. The light emitting device of claim 2, wherein the tube body is transparent and is sealed at both ends of the tube body.

4. The light emitting device of claim 1, wherein a switch is disposed between two ends of the second wire, wherein the second wire has a first section arranged between the switch and the second electrode, and a second section arranged between the switch and the tube body; the switch is used to establish or cut an electrical connection between the first section and the second section.

5. The light emitting device of claim 1, wherein the shell element comprises a first shell part and a second shell part that are combined to form the housing space.

6. The light emitting device of claim 5, wherein the first shell part has a first pedestal, and the first pedestal has an inclined plane; the second shell part has a second pedestal, and the second pedestal has an oblique groove; when the first shell part and the second shell part are combined with each other, the tube body is arranged between the inclined plane and the oblique groove, so that the tube body is inclined inside the housing space.

7. The light emitting device of claim 6, wherein the second shell part has an accommodation part which is light-transmissive, and the light emitting element is accommodated in the accommodation part, such that the light emitted therefrom is able to pass through the accommodation part.

8. The light emitting device of claim 1, further comprising a positioning element, the positioning element having an accommodation hole for being attached to the shell element, whereby the shell element is fixed on an object through the positioning element.

9. The light emitting device of claim 8, wherein the positioning element is a shell formed in a U shape and has a socket for being attached to the object.

10. The light emitting device of claim 9, wherein the positioning element has an engaging groove at two ends of the socket, respectively, and the shell element has an engaging block corresponding to each of the engaging grooves, such that when the shell element is attached to the accommodation hole, the engaging block is engaged with the corresponding engaging groove to be positioned.

* * * * *